US010333459B2

(12) United States Patent
Oh et al.

(10) Patent No.: US 10,333,459 B2
(45) Date of Patent: Jun. 25, 2019

(54) PHOTOVOLTAIC MODULE MOUNTING ASSEMBLY HAVING A PIN CONSTRAINT

(71) Applicant: SUNPOWER CORPORATION, San Jose, CA (US)

(72) Inventors: Jason Oh, El Cerrito, CA (US); Brian Wares, San Francisco, CA (US); Nicholas James McKibben, Oakland, CA (US)

(73) Assignee: SunPower Corporation, San Jose, CA (US)

( * ) Notice: Subject to any disclaimer, the term of this patent is extended or adjusted under 35 U.S.C. 154(b) by 145 days.

(21) Appl. No.: 15/254,988

(22) Filed: Sep. 1, 2016

(65) Prior Publication Data
US 2018/0062569 A1    Mar. 1, 2018

(51) Int. Cl.
| | | |
|---|---|---|
| *H02S 30/10* | (2014.01) | |
| *F16B 7/04* | (2006.01) | |
| *H02S 20/32* | (2014.01) | |
| *H02S 40/30* | (2014.01) | |
| *F16B 7/18* | (2006.01) | |

(52) U.S. Cl.
CPC ............ *H02S 30/10* (2014.12); *F16B 7/0473* (2013.01); *F16B 7/0493* (2013.01); *F16B 7/185* (2013.01); *H02S 20/32* (2014.12); *H02S 40/30* (2014.12)

(58) Field of Classification Search
CPC .......... H02S 30/10; H02S 20/32; H02S 40/30; F16B 7/0493
USPC ........................................................ 136/246
See application file for complete search history.

(56) References Cited

U.S. PATENT DOCUMENTS

| | | | |
|---|---|---|---|
| 6,672,018 B2 | 1/2004 | Shingleton | |
| 8,757,567 B2 | 6/2014 | Ciasulli et al. | |
| 9,347,691 B2 | 5/2016 | West et al. | |
| 9,395,104 B2 | 7/2016 | Grushkowitz | |
| 2009/0053344 A1* | 2/2009 | Girard ................ | B29D 30/0629 425/46 |
| 2009/0273146 A1* | 11/2009 | Dezheng ................ | B23D 51/10 279/78 |
| 2010/0066068 A1* | 3/2010 | McMahan ................. | B60S 9/08 280/763.1 |
| 2014/0090637 A1 | 4/2014 | Grushkowitz | |
| 2014/0117190 A1* | 5/2014 | Werner ...................... | F24J 2/14 248/346.03 |
| 2014/0159844 A1* | 6/2014 | Suzuki ................... | H01F 27/06 336/65 |

(Continued)

OTHER PUBLICATIONS

U.S. Appl. No. 15/081,320, filed Mar. 25, 2016, titled "Sun Tracking Solar Energy Collection System and Method of Assembly", by inventor Brian Wares, et al., 33 pages (specification and drawings).

*Primary Examiner* — Jayne L Mershon
(74) *Attorney, Agent, or Firm* — Schwabe, Williamson & Wyatt, P.C.

(57) ABSTRACT

A mounting assembly for a photovoltaic (PV) module, and systems including such mounting assemblies, are described. In an example, the mounting assembly includes a top support and a bottom support having respective mounting walls, and holes through the mounting walls. A pin assembly may extend through the holes in the mounting walls to constrain the supports, for example, relative to a torque member of a solar-tracking PV system. The pin assembly may include end collars to engage and distribute loading from the torque member.

20 Claims, 9 Drawing Sheets

(56) References Cited

U.S. PATENT DOCUMENTS

| | | |
|---|---|---|
| 2014/0246549 A1 | 9/2014 | West et al. |
| 2014/0360562 A1* | 12/2014 | Hartelius ............... F24J 2/5233 |
| | | 136/251 |
| 2015/0000721 A1* | 1/2015 | Au .......................... H02S 20/32 |
| | | 136/246 |
| 2015/0292180 A1* | 10/2015 | Sester ..................... E02F 9/006 |
| | | 37/399 |
| 2016/0028345 A1 | 1/2016 | Wares et al. |

* cited by examiner

PHOTOVOLTAIC MODULE MOUNTING ASSEMBLY HAVING A PIN CONSTRAINT

BACKGROUND

Some sun-tracking solar power systems, such as utility-scale photovoltaic installations, are designed to pivot a large number of solar modules to track the movement of the sun. For example, sun-tracking solar power systems may include rows of solar modules supported on torque tubes. The solar modules are commonly attached to supportive structures using conventional fasteners, such as bolts or rivets. The supportive structures, in turn, are commonly attached to the torque tubes by welded joints.

DETAILED DESCRIPTION

Figure 1:
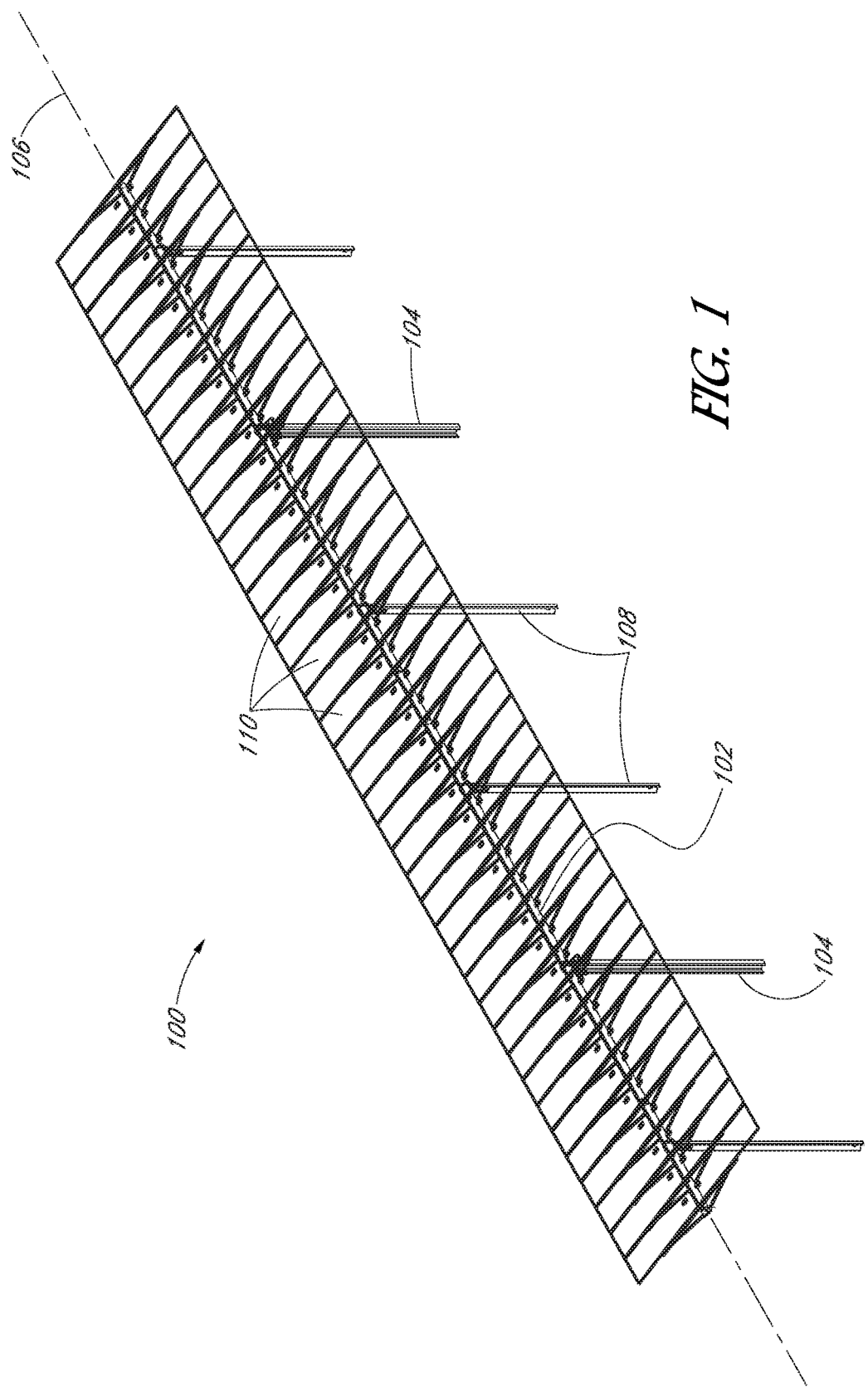
FIG. 1 illustrates a perspective view of a solar-tracking photovoltaic (PV) system, in accordance with an embodiment of the present disclosure.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Terminology

The following paragraphs provide definitions and/or context for terms found in this disclosure (including the appended claims):

"Comprising." This term is open-ended. As used in the appended claims, this term does not foreclose additional structure or steps.

"Configured To." Various units or components may be described or claimed as "configured to" perform a task or tasks. In such contexts, "configured to" is used to connote structure by indicating that the units/components include structure that performs those task or tasks during operation. As such, the unit/component can be said to be configured to perform the task even when the specified unit/component is not currently operational (e.g., is not on/active). Reciting that a unit/circuit/component is "configured to" perform one or more tasks is expressly intended not to invoke 35 U.S.C. § 112, sixth paragraph, for that unit/component.

"First," "Second," etc. As used herein, these terms are used as labels for nouns that they precede, and do not imply any type of ordering (e.g., spatial, temporal, logical, etc.). For example, reference to a "first" end does not necessarily imply that this end is the first end in a sequence; instead the term "first" is used to differentiate this end from another end (e.g., a "second" end).

"Coupled"—The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically.

In addition, certain terminology may also be used in the following description for the purpose of reference only, and thus are not intended to be limiting. For example, terms such as "upper," "lower," "above," "below," "in front of," and "behind" refer to directions in the drawings to which reference is made. Terms such as "front," "back," "rear," "side," "outboard," "inboard," "leftward," and "rightward" describe the orientation and/or location of portions of a component, or describe the relative orientation and/or location between components, within a consistent but arbitrary frame of reference which is made clear by reference to the text and the associated drawings describing the component(s) under discussion. Such terminology may include the words specifically mentioned above, derivatives thereof, and words of similar import.

"Inhibit"—As used herein, inhibit is used to describe a reducing or minimizing effect. When a component or feature is described as inhibiting an action, motion, or condition it may completely prevent the result or outcome or future state completely. Additionally, "inhibit" can also refer to a reduction or lessening of the outcome, performance, and/or effect which might otherwise occur. Accordingly, when a component, element, or feature is referred to as inhibiting a result or state, it need not completely prevent or eliminate the result or state.

Although many of the examples described herein are for solar-tracking photovoltaic (PV) systems, the techniques and structures may apply equally to other non-solar-tracking or stationary solar energy collection systems, as well as concentrated thermal solar systems, etc. Moreover, although much of the disclosure is described in terms of ground-mounted solar-tracking solar energy collection installations, the disclosed techniques and structures apply equally to other solar energy collection installations, e.g., rooftop solar installations.

The use of conventional fasteners, such as nuts, bolts, or rivets, to attach a PV module to a supportive structure, or to attach the supportive structure to a torque tube, is commonplace today. Such fasteners and welded joints represent a significant cost, both in terms of manufacturing material costs and installation costs. Reducing the construction cost of PV systems can significantly impact the feasibility of constructing such systems as renewable energy sources contributing to the power grid. Furthermore, construction costs can be reduced by assembling system components using fastening mechanisms other than rivets or welds.

In an aspect, a mounting assembly for a PV module includes a top support and a bottom support having respective mounting walls, and holes through the mounting walls. A pin assembly may extend through the holes in the mounting walls to constrain the supports relative to a torque member of a solar-tracking PV system. The pin assembly may include end collars to engage and distribute loading from the torque member. Accordingly, a structural truss system may be attached to a torque tube using a low-cost alternative to a welded joint.

In an aspect, a mounting assembly for a PV module includes a top strut to support the PV module, and a retainer fixed relative to the top strut. The retainer may have an upright and retaining tab portion forming a receiving gap to receive the PV module. The retainer may constrain movement of the PV module mounted on the top strut. For example, the upright and retaining tab may prevent vertical or lateral motion of the PV module mounted on the mounting assembly. Accordingly, a PV module may be attached to a mounting assembly using a low-cost alternative to conventional fasteners, such as rivets.

The aspects described above may be realized by the mounting assemblies disclosed herein. In the following description, numerous specific details are set forth, such as specific material regimes and component structures, in order to provide a thorough understanding of embodiments of the present disclosure. It will be apparent to one skilled in the art that embodiments of the present disclosure may be practiced without these specific details. In other instances, well-known fabrication techniques or component structures, such as specific types of actuators or techniques for coupling such actuators with system components, are not described in detail in order to not unnecessarily obscure embodiments of the present disclosure. Furthermore, it is to be understood that the various embodiments shown in the figures are illustrative representations and are not necessarily drawn to scale.

By way of summary, disclosed herein is a mounting assembly including a top support member, a bottom support member, and a pin assembly having a pin extending through the top support member and the bottom support member, is described. One or more of the top support member or the bottom support member may include mounting walls having concave surfaces to conform to a mounting structure of a PV system, e.g., a torque member. The pin assembly can be preloaded in tension to secure the support members against the torque member. In an embodiment, the pin assembly may include end collars having larger diameters than the pin, and the end collars may insert through the mounting walls and the walls of the torque member. Accordingly, the end collars may distribute shear loading applied by the torque member during use. One or more top strut(s) and bottom struts may be assembled to respective support members to form a rigid truss system. Accordingly, a PV module may be mounted on the truss system above the torque member. As such, a PV laminate of PV module may rotate to track the sun when the torque member pivots about a longitudinal axis.

Referring to FIG. 1, a perspective view of a solar-tracking photovoltaic (PV) system is shown in accordance with an embodiment of the present disclosure. An electricity farm may include one or more solar-tracking PV systems 100. Solar-tracking PV system 100 may be considered a multi-drive system because several motor drives may be coupled to a same torque member 102 to input torque to the torque member at longitudinally separated locations. In an embodiment, solar-tracking PV system 100 includes several driven support assemblies 104 supporting torque member 102 above the ground at the longitudinally separated locations. Each driven support assembly 104 may include a drive having a motor, e.g., a stepper motor, and a gearset, e.g. a worm drive, to input torque to torque member 102 such that torque member 102 pivots about longitudinal axis 106.

Solar-tracking PV system 100 may also include several non-driven support assemblies 108 supporting torque member 102 above the ground. For example, a non-driven support assembly 108 may be positioned longitudinally between a pair of driven support assemblies 104. Each non-driven support assembly 108 may support, and allow for rotation of, torque member 102 about longitudinal axis 106 without inputting torque to torque member 102. Thus, non-driven support assemblies 108 may facilitate a stable rotation of torque member 102 without actually driving such rotation.

The support assemblies may support torque member 102 along longitudinal axis 106. Driven support assemblies 104 may affect rotation of torque member 102 about longitudinal axis 106 based on electrical inputs provided or controlled by a controller (not shown). The controller may include a microprocessor or computer configured to control the delivery of electrical power to motors of driven support assemblies 104 along torque member 102. For example, the controller may directly or indirectly, e.g., through control of a power supply, deliver an electrical power input to a first driven support assembly 104 and an electrical power input to a second driven support assembly 104. Accordingly, the motors and/or mechanical transmission components of the driven support assemblies 104 may be simultaneously controlled by controller to input torque to the torque member 102. Thus, torque member 102 may pivot or rotate about longitudinal axis 106.

Several PV modules 110 may be mounted on torque member 102 along longitudinal axis 106. For example, solar-tracking PV system 100 may include a row of tens of PV modules arranged in a series. The series may include, for example, 70-100 PV modules 110 between a first outward end and a second outward end of torque member 102. Thus, the row of PV modules 110 may track a solar source, e.g., the sun or a reflective surface redirecting sunrays toward PV modules 110, when torque member 102 pivots about longitudinal axis 106.

Figure 2:
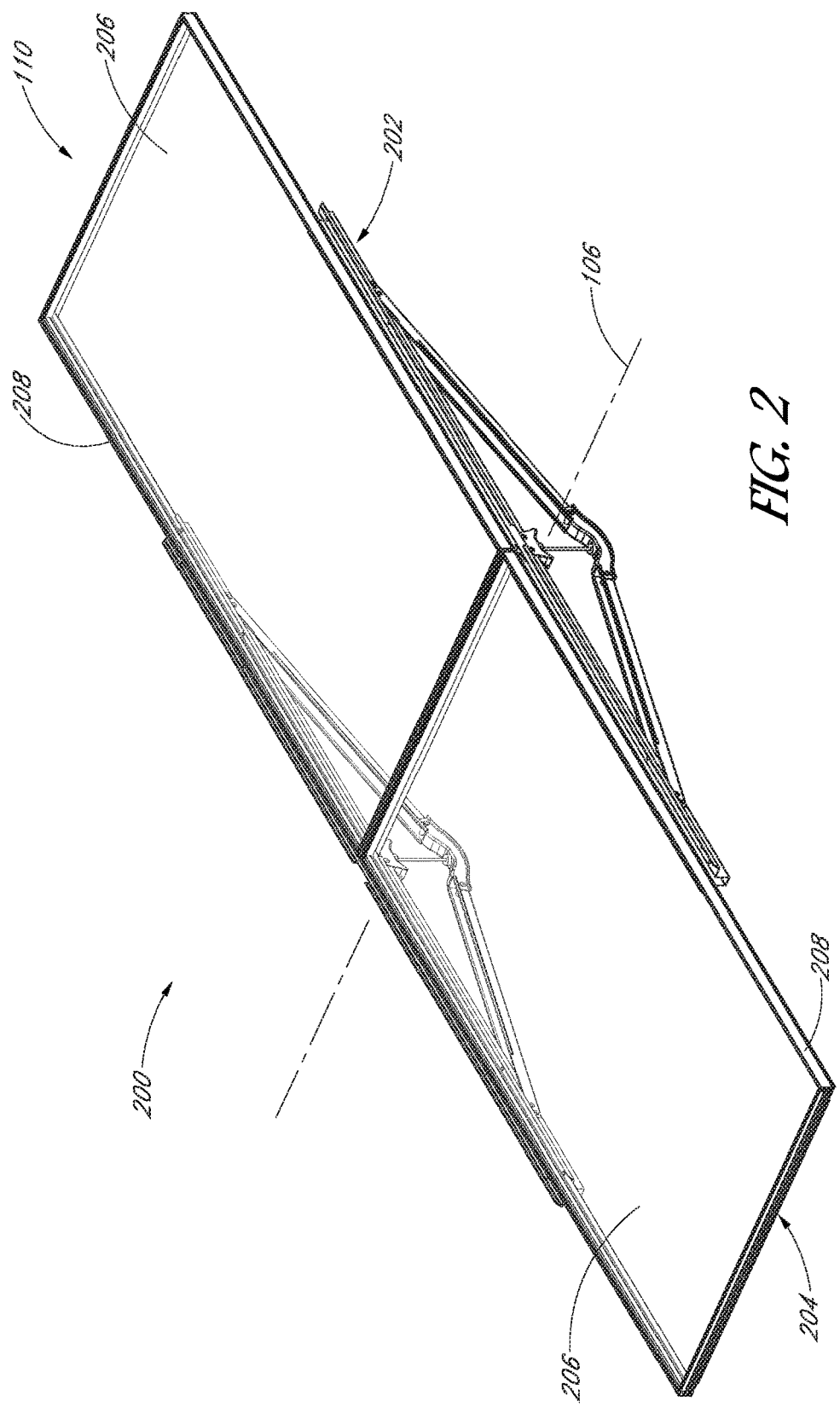
FIG. 2 illustrates a perspective view of a PV module assembly, in accordance with an embodiment of the present disclosure.

Referring to FIG. 2, a perspective view of a PV module assembly is shown in accordance with an embodiment of the present disclosure. A PV module assembly 200 may include PV module 110 mounted on a mounting assembly 202. Mounting assembly 202 may include structural members to attach to torque member 102 (not shown) along longitudinal axis 106, and to provide support to one or more PV modules 110. It will be appreciated that torque member 102 as described herein, i.e., a pivotable torque member 102, is provided by way of example and is not intended to limit the types of structures on which mounting assembly 202 may be mounted. For example, mounting assembly 202 may be mounted on a rail, beam, or any other general mounting structure that is fixed to a stationary platform, e.g., a rooftop or the ground. That is, rather than tracking the sun, PV system 100 may be a fixed tilt PV system.

PV module assembly 200 may include several PV modules 110. For example, a first PV module 110 and a second PV module 204 may be mounted on opposite sides of a plane containing longitudinal axis 106. Each PV module 110 may include a PV laminate 206 mounted on a PV frame 208. PV laminate 206 may include one or more solar collecting devices, e.g., PV cells, and PV laminate 206 and PV cells may be configured to receive sunlight for conversion into electrical energy. For example, the PV cells may be laminated between an optically transparent upper cover and a back cover. By way of example, the PV cells may be encapsulated by an encapsulant material between a glass top plate and a back sheet. The back sheet may be optically transparent, e.g., formed from glass, or opaque. Thus, sunlight may transmit through one or more of the top plate or back sheet to the PV cells for conversion into electricity.

Each PV frame 208 may support a respective PV laminate 206 along an outer perimeter and/or a back surface of the laminate structure. For example, PV frame 208 may include one or more cross members supporting the back surface of PV laminate 206. PV frame 208 may be mounted on mounting assembly 202, as described below. Accordingly, a front surface of PV laminate 206 may face a direction orthogonal to torque member 102 to capture impinging sunlight as torque member 102 pivots about longitudinal axis 106.

An orientation of PV module 110 may be considered a portrait orientation or a landscape orientation. The portrait orientation and the landscape orientation may be defined based on a relationship of a long edge of PV module 110 relative to torque tube 102, or to a north-south direction. Torque tube 102 may ordinarily be oriented such that longitudinal axis 106 extends in the north-south direction, allowing PV modules to rotate from east to west about longitudinal axis 106 to track the solar source. PV module 110 may have a rectangular profile, having a long edge and a short edge. In an embodiment, a portrait orientation of PV module 110 refers to an orientation of PV module 110 having the long edge perpendicular to torque tube 102 and/or longitudinal axis 108 (FIGS. 1-2). The landscape orientation, by contrast, may be an orientation of PV module 110 having the short edge perpendicular to torque tube 102 and the long edge parallel to torque tube 102. Accordingly, it will be appreciated that PV module 110 may be oriented in numerous manners relative to torque tube 102 within the scope of this description.

Figure 3:
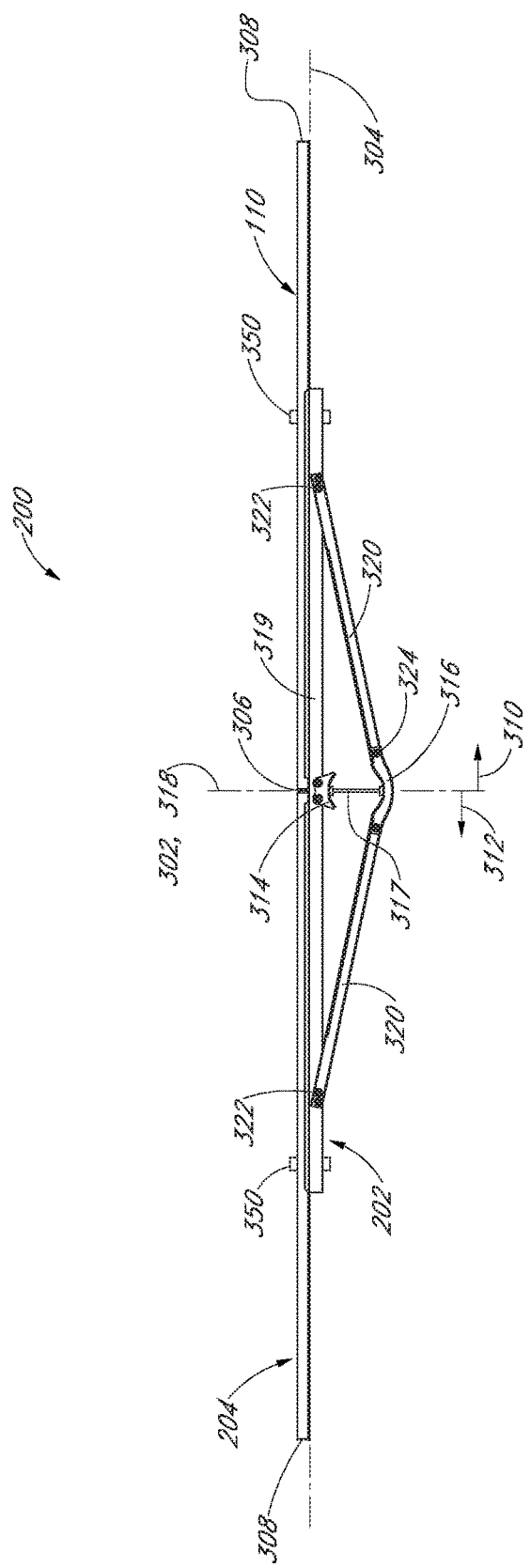
FIG. 3 illustrates a side view of a PV module assembly, in accordance with an embodiment of the present disclosure.

Referring to FIG. 3, a side view of a PV module assembly is shown in accordance with an embodiment of the present disclosure. A pair of PV modules may be butterflied about longitudinal axis 106. That is, first PV module 110 may extend laterally outward from a vertical plane 302 containing longitudinal axis 106, and second PV module 204 may extend laterally outward in a second direction from vertical plane 302. Front and rear surfaces of PV laminate 206 of each PV module may extend along or be parallel to a lateral plane 304. Accordingly, each PV module may extend in a lateral direction from an inward edge 306 to an outward edge 308. Vertical plane 302 may extend along longitudinal axis 106 orthogonal to the lateral direction, and thus, may define a first side 310 and a second side 312 of mounting assembly 202 on either side of torque member 102 (not shown).

In an embodiment, mounting assembly 202 includes a top support member 314 and a bottom support member 316 aligned along vertical plane 302. Top support member 314 and bottom support member 316 may be mounted on torque member 102 (not shown) and interconnected by a pin assembly 317. More particularly, torque member 102 may be disposed between top support member 314 and bottom support member 316 along vertical plane 302, and pin assembly 317 may extend through torque member 102 from top support member 314 to bottom support member 316. Thus, torque member 102 may be gripped between top support member 314 and bottom support member 316 to secure mounting assembly 202 to torque member 102 such that mounting assembly 202 pivots in coordination with torque member 102.

Mounting assembly 202 may include one or more struts to form a truss system. For example, one or more top struts 319 may extend orthogonal to vertical plane 302, and orthogonal to a pin axis 318 extending through pin assembly 317. More particularly, a singular top strut 319 or a pair of top struts 319 may extend laterally outward from top support member 314 to suspend, and support a weight of, PV module 110 above torque member 102. Top strut(s) 319 may be separate truss system structures attached to top support member 314, e.g., by a fastener joint. Alternatively, one or more top struts 319 may be integrally formed with top support member 314. In the description below, top support member 314 is described as a separate component. However, many of the same features may be present in an embodiment having top support member 314 and top strut(s) 319 formed as a unitary body.

The truss system provided by mounting assembly 202 may also include one or more bottom strut 320. For example, several bottom struts 320 may extend between bottom support member 316 and top strut 319. That is, each bottom strut 320 may be coupled to top strut 319 at a first end 322, and may be coupled to bottom support member 316 at a second end 324. Bottom struts 320 may be separate truss system structures attached to bottom support member 316, e.g., by a fastener joint. Alternatively, one or more bottom struts 320 may be integrally formed with bottom support member 316. In the description below, bottom support member 316 is described as a separate component. However, many of the same features may be present in an embodiment having bottom support member 316 and bottom strut(s) 320 formed as a unitary body.

In an embodiment, bottom support member 316 may be formed by the combination of separate portions of bottom struts 320. For example, one skilled in the art could envision a pair of bottom struts 320 extending from respective first ends 322 at top strut 319 to respective second ends 324 that overlap along pin axis 318. That is, bottom struts 320 may include mounting surfaces, e.g., faces of respective tabs, that overlap each other and include holes aligned along pin axis 318 to receive pin assembly 317. Accordingly, bottom struts 320 may stabilize the truss system to an underside of torque member 102, without requiring a separate bottom support member 316 as described below.

Figure 4:
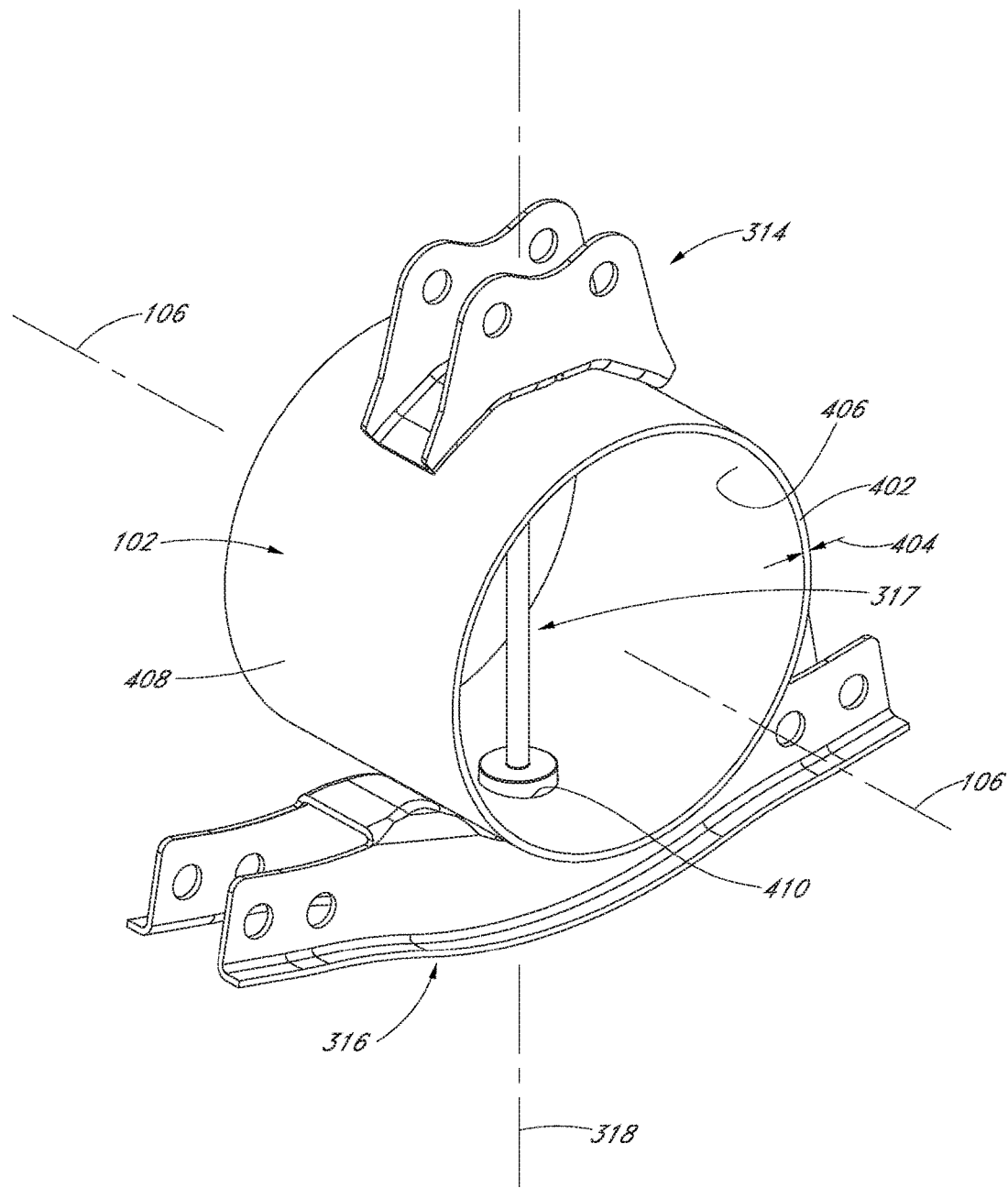
FIG. 4 illustrates a perspective view of a mounting assembly coupled to a torque member, in accordance with an embodiment of the present disclosure.

Referring to FIG. 4, a perspective view of a mounting assembly coupled to a torque member is shown in accordance with an embodiment of the present disclosure. Torque member 102 may include a member wall 402 extending around longitudinal axis 106. In an embodiment, member wall 402 includes an annular cross-sectional area, and thus, torque member 102 is a torque tube. A torque tube may include a cylindrical tubular member (as shown) or any other tubular cross-sectional area geometry. For example, torque member 102 may include a rectangular cross-sectional area having a wall thickness 404. Accordingly, torque member 102 may include an inner lumen, i.e., a space within an inner surface 406 of member wall 402. Torque member 102 can, however, have a solid cross-sectional area. For example, torque member 102 may include a solid rod having a circular or rectangular outer profile.

In an embodiment, top support member 314 and bottom support member 316 are mounted on opposite surfaces of member wall 402. For example, top support member 314 may be mounted on a top side of outer surface 408 of member wall 402 along pin axis 318 and bottom support member 316 may be mounted on a bottom side of outer surface 408 of member wall 402 along pin axis 318. Accordingly, top support member 314 may be mounted on member wall 402, above a mounting hole 410 (FIG. 6) in the top surface of member wall 402, and bottom support member 316 may be mounted on member wall 402, below a mounting hole 410 in the bottom surface of member wall 402. Mounting holes 410 on top side and bottom side of torque member 102 may provide a pair of diametrically opposed holes to receive pin assembly 317.

Figure 5:
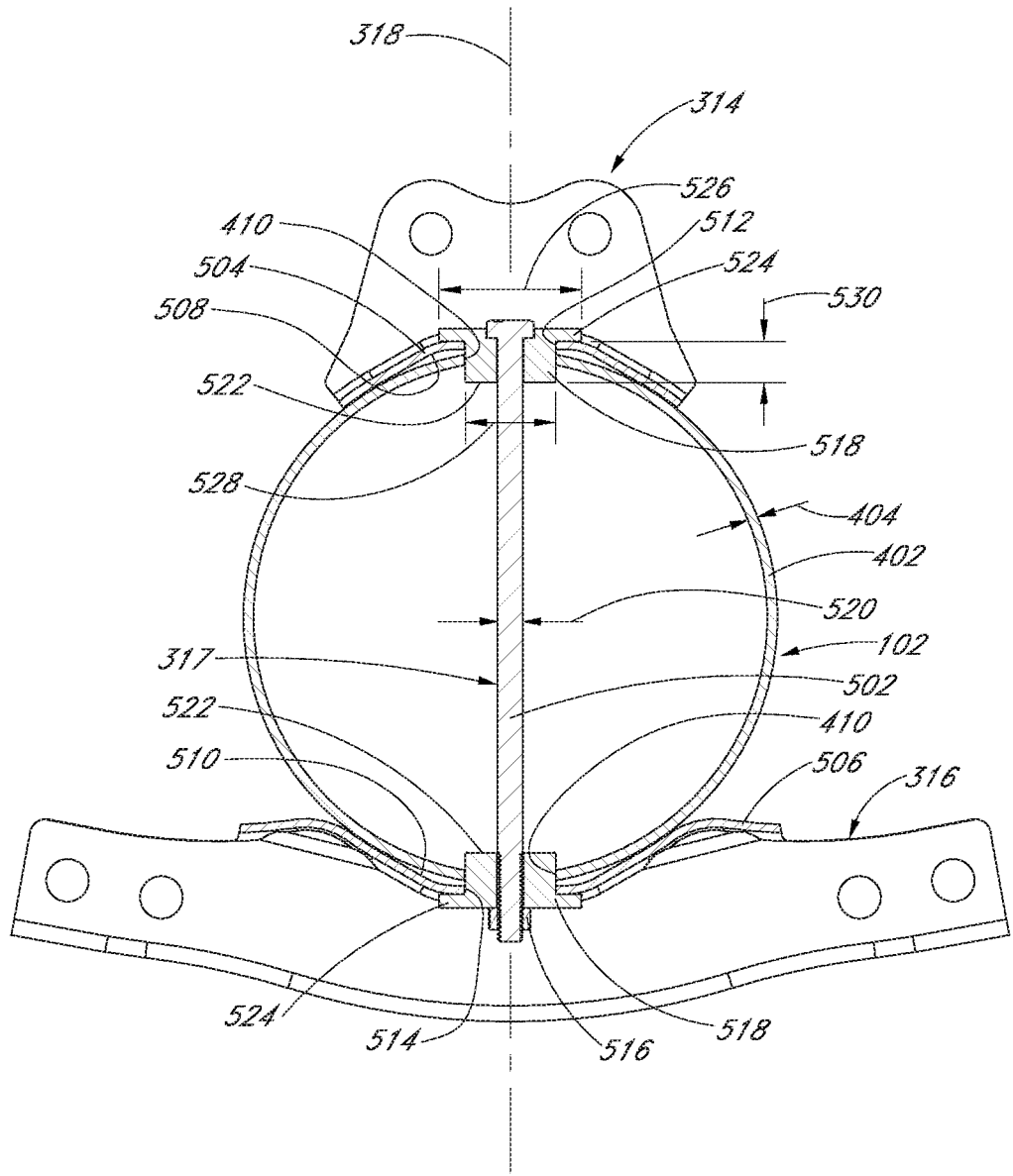
FIG. 5 illustrates a side view of a mounting assembly coupled to a torque member, in accordance with an embodiment of the present disclosure.

Referring to FIG. 5, a side view of a mounting assembly coupled to a torque member is shown in accordance with an embodiment of the present disclosure. Pin assembly 317 includes a pin 502 extending along pin axis 318. More particularly, pin 502 may extend through mounting holes 410 on either side of member wall 402 and through the inner lumen of torque member 102. Furthermore, pin 502 may extend through both top support member 314 and bottom support member 316.

In an embodiment, top support member 314 includes a top mounting wall 504 mounted on torque member 102. Similarly, bottom support member 316 may include a bottom mounting wall 506 mounted on torque tube member. Each mounting wall may be configured to be stably attached to member wall 402. For example, when member wall 402 has an annular cross-sectional profile, one or more of top mounting wall 504 or bottom mounting wall 506 may include a concave surface facing outer surface 408 of member wall 402. That is, top mounting wall 504 may include a concave downward surface 508 facing bottom mounting wall 506, and bottom mounting wall 506 may include a concave upward surface 510 facing top mounting wall 504. The concave surfaces may conform to member wall 402. Thus, the respective mounting walls of top support member 314 and bottom support member 316 may stabilize mounting assembly 202 against torque member 102.

The curvature of top mounting wall 504 and bottom mounting wall 506 may not be necessary to stabilize mounting assembly 202 against torque member 102. For example, at least one of the mounting walls may have a flat surface facing torque member 102, e.g., the mounting walls may be laterally oriented planar walls. In such case, stability of mounting assembly 202 may come not from the conforming surfaces of the assembled structure, but rather, may stem from the components being squeezed together by an external load.

The external load pressing top support member 314 and bottom support member 316 against torque member 102 may be a compressive force applied by pin assembly 317 along pin axis 318. In an embodiment, top support member 314 includes a top support member hole 512 extending through top mounting wall 504 in alignment with pin axis 318. Similarly, bottom support member 316 may include a bottom support member hole 514 extending through bottom mounting wall 506 in alignment with pin axis 318. Thus, pin 502 of pin assembly 317 may extend along pin axis 318 through top support member hole 512, bottom support member hole 514, and mounting holes 410 such that an upper end of pin 502 is above top mounting wall 504 and a lower end of pin 502 is below bottom mounting wall 506.

Furthermore, pin 502 may include a head, nut, split pin, flange, or a similar feature at one or both end to constrain pin 502 relative to top support member 314 and bottom support member 316. In an embodiment, pin 502 includes a bolt head at one end and a threaded end at another end that may be assembled to a nut 516 to generate an axial clamping load on the support members 314, 316. More particularly, nut 516 may be tightened to squeeze top support member 314 and bottom support member 316 against torque tube. Thus, the support members may be stabilized against torque member 102.

It will be appreciated that, when pin 502 is fixed in space along pin axis 318, rotation of top support member 314, bottom support member 316, and torque member 102 relative to each other about longitudinal axis 106 is resisted by pin assembly 317. By extension, when torque member 102 pivots about longitudinal axis 106, member wall 402 exerts a rotational load on pin 502 that is transmitted to top support member 314 and bottom support member 316 to rotate mounting assembly 202 about longitudinal axis 106 and to tilt PV module 110 toward the sun. The loading between torque member 102 and pin assembly 317 may generate shear stresses that can be designed for to avoid system failure.

In an embodiment, pin assembly 317 includes one or more end collars 518. For example, a respective end collar 518 may be mounted at the upper end of pin 502 and/or the lower end of pin 502. End collars 518 may be separate structures, e.g., thick-walled tubular structures having holes to receive pin 502, or end collars 518 may be integral to pin 502. That is, pin 502 may be formed to include a middle section having a pin diameter 520 and one or more end sections having a larger hub diameter 528.

The respective end collars 518 may be disposed in top support member 314 and/or bottom support member 316. More particularly, a first end collar 518 may be disposed in top support member hole 512 and a second end collar 518 may be disposed in a bottom support member hole 514. End collars 518 may be configured to distribute a load applied by torque member 102 to pin 502.

In an embodiment, distribution of shear stress may be achieved by end collar 518 having collar diameter 528 greater than pin diameter 520. For example, collar diameter 528 of at least one end collar 518 of pin assembly 317 may be at least twice pin diameter 520. As such, end collars 518 may be sized to accommodate shear loads applied by torque during use, e.g., by wind loading acting on torque member 102, and pin 502 may be sized to accommodate tension loads applied during system installation, e.g., by tightening nut 516 to hold the PV module assembly together. It will be appreciated that the structure of pin assembly 317 may realize cost advantages as compared to a pin 502 having a constant diameter, which may be wider in a middle section than is required by the pin function.

A structure of end collar 518 may also include a collar flange portion. Collar flange 524 may act as a stop to limit an insertion depth of end collar 518 into support member holes 512, 514 and mounting holes 410. To that end, collar flange 524 may include a flange diameter 526 greater than collar diameter 528. Thus, collar flange 524 may interfere with outer surfaces 408 of the mounting walls 504, 506 and/or member wall 402. That is, collar flanges 524 may be located outside of the support members 314, 316 and may press inward on the support members when nut 516 is tightened to place pin 502 in tension.

Each end collar 518 may extend through top mounting wall 504 or bottom mounting wall 506 from collar flange 524 outside of support members 314, 316. That is, end collar 518 may have a collar height 530 between collar flange 524 and collar end 522. Collar height 530 may be sufficient to reduce the likelihood that collar end 522 will dislodge from support member holes 512, 514 or mounting holes 410 during use. More particularly, end collar 518 may extend from collar flange 524 outside of support members 314, 316 to collar end 518 between the support members. For example, collar end 518 may be disposed within the inner lumen of torque member 102. Moreover, collar end 522 may extend into the inner lumen to a sufficient depth such that any jostling in the assembled system does not cause collar end 518 to retract above (or below) the outer surface 408 of member wall 402. In an embodiment, each end collar 518 includes collar height 530 that is at least twice wall thickness 404 of member wall 402 and/or a thickness of a respective mounting wall. For example, collar height 530 may be at least twice a distance between an outer surface 408 of top mounting wall 504 and the inner surface 406 of member wall 402.

Figure 6:
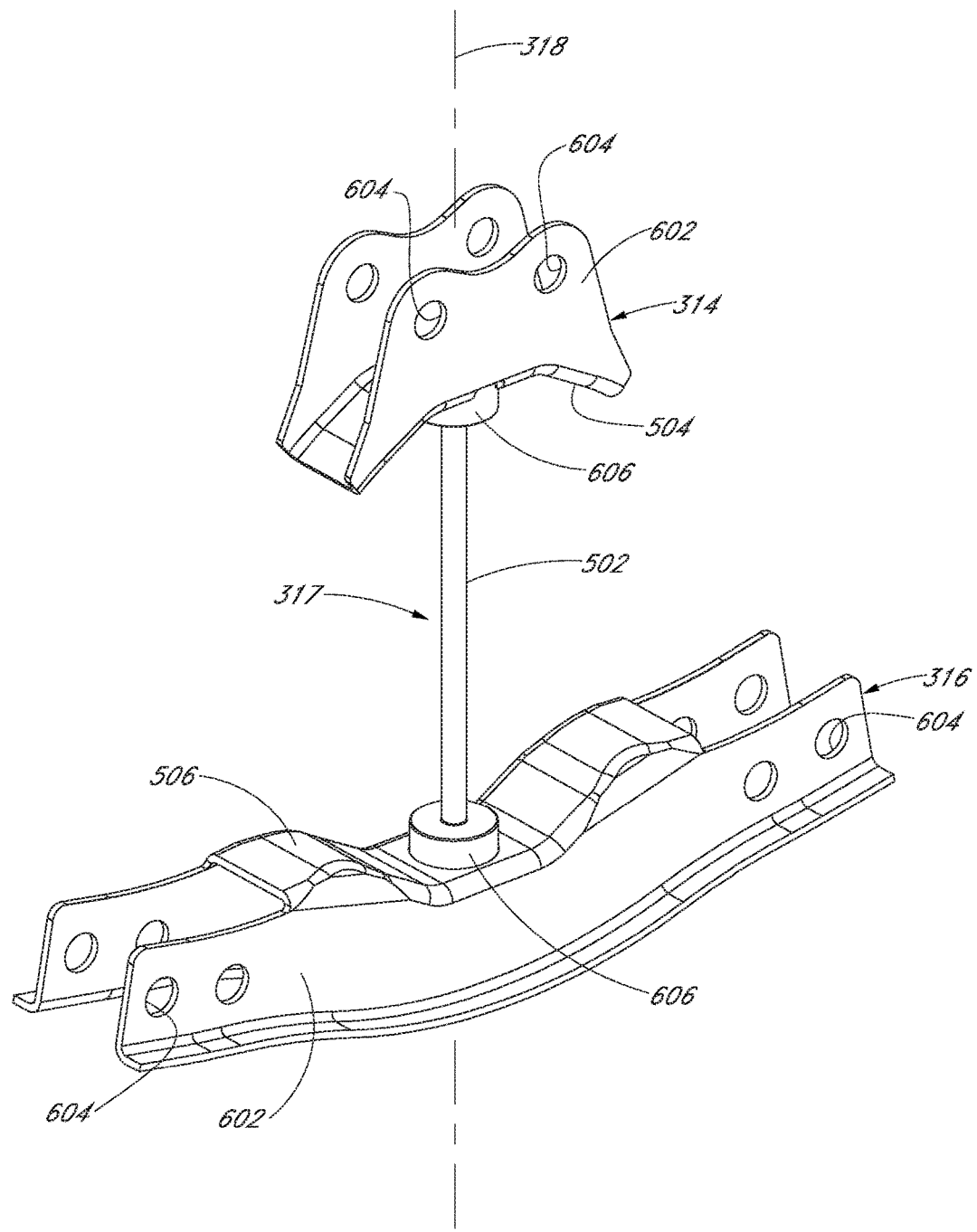
FIG. 6 illustrates a perspective view of a mounting assembly, in accordance with an embodiment of the present disclosure.

Referring to FIG. 6, a perspective view of a mounting assembly is shown in accordance with an embodiment of the present disclosure. Top support member 314 and bottom support member 316 may be separate components from struts of mounting assembly 202, and thus, the support members may be configured to attach to the struts to form a rigid truss system. For example, the support members may include respective bracket walls 602 extending from respective mounting walls. For example, one or more bracket wall 602 may extend vertically upward from top mounting wall 504, and one or more bracket wall 602 may extend vertically downward from bottom mounting wall 506. In an embodiment, each support member may include a pair of bracket walls 602 spaced apart in the longitudinal direction to provide a gap for receiving top strut(s) 319 and/or bottom struts 320. Furthermore, each bracket wall 602 may include one or more bracket holes to receive a fastener such as a pin or a bolt, which may extend through a strut received within the gap between bracket walls 602. Accordingly, respective struts may be fastened to bracket walls 602 of the support members, and thus, the struts may extend outward from the bracket walls 602 to connect to each other, e.g., at first end 322 of bottom strut 320. For example, top strut 319 may extend outward from top mounting wall 504 to allow PV frame 208 to be mounted on top strut 319 above torque member 102.

Outermost bracket holes 604 of bracket walls 602 may be separated by a lateral distance. For example, bracket holes 604 of top support member 314 may be symmetrically disposed about vertical plane 302 containing pin axis 318 and separated by a first lateral distance, and bracket holes 604 of bottom support member 316 may be symmetrically disposed about vertical plane 302 and separated by a second lateral distance. In an embodiment, the second lateral distance between bracket holes 604 of bottom support member 316 is greater than the first lateral distance between bracket holes 604 of top support member 314. For example, the location(s) at which top strut(s) 319 attach to top support member 314 may be located above (within) a profile of torque member 102 when viewed from above, and the locations at which bottom struts 320 attached to bottom support member 316 may be laterally outside of (not within) the profile of torque member 102. Such relative positioning of the respective fastening points may improve tool access and ease system installation.

As shown in FIG. 6, end collars, rather than being collar components of pin assembly, may be integrally formed with the support members. For example, top support member 314 may include a boss 606 extending from concave downward surface 508 of top mounting wall 504, and bottom support member 316 may include boss 606 extending from concave upward surface 510 of bottom mounting wall 506. Bosses 606 may have a geometry similar to the portion of end collar 518 extending from collar flange 524, as described above. Accordingly, bosses 606 may distribute shear stress applied by torque member 102. As with pin assembly 317, pin 502 may extend through bosses 606, and may be tensioned by nut 516 (not shown).

Figure 7:
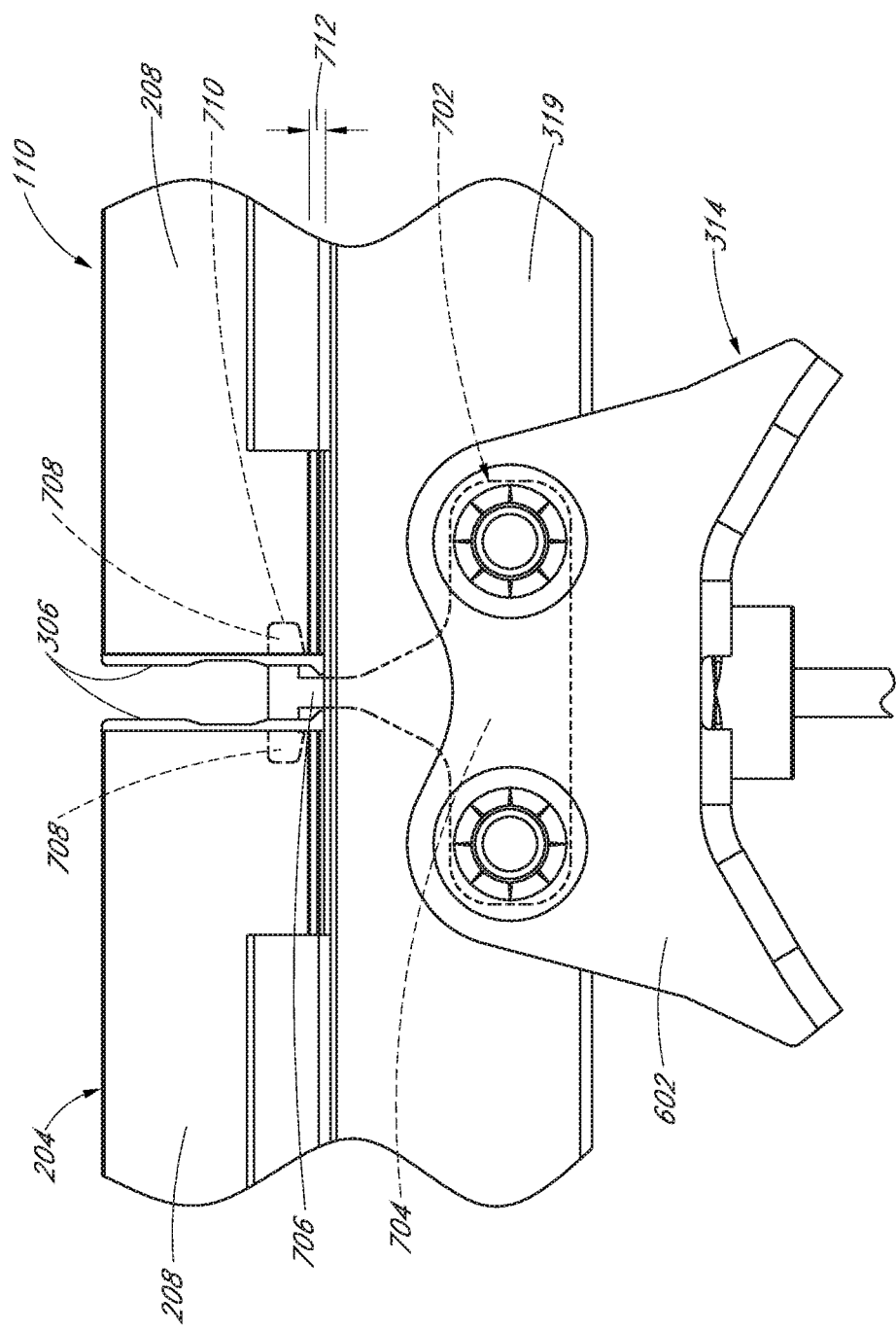
FIG. 7 illustrates a side view of a mounting assembly including a retainer constraining a PV module, in accordance with an embodiment of the present disclosure.

Referring to FIG. 7, a side view of a mounting assembly including a retainer constraining a PV module is shown in accordance with an embodiment of the present disclosure. Mounting assembly 202 may include features to constrain relative movement of PV module 110 in one or more directions when PV frame 208 is mounted on top strut 319. In an embodiment, a retainer 702 is fixed relative to top strut 319. For example, a base 704 of retainer 702 may be fastened to bracket wall 602 of top support member 314. Alternatively, retainer 702 may be attached to top strut 319, torque member 102, or any other component fixed relative thereto. Furthermore, in an embodiment, retainer 702 may be integrally formed with a component of mounting assembly 202, such as top support member 314.

A geometry of retainer 702 may include a vertical component and a lateral component. Retainer 702 may include an upright 706 extending orthogonal to the lateral direction, i.e., orthogonal to lateral plane 304. Upright 706 may include a post, a vertical tab, or another vertically oriented feature extending along vertical plane 302. A height of upright 706 may be sufficient to dispose an upper end of upright 706 laterally between inward edges 306 of adjacent PV frames 208. For example, upright 706 may separate PV frames 208, i.e., act as a spacer to prevent inward edge 306 of PV module 110 on first side 310 of vertical plane 302 from being pressed against inward edge 306 of second PV module 204 on second side 312 of vertical plane 302. Accordingly, upright 706 may constrain lateral movement of PV frames 208 to maintain PV frame 208 of PV module 110 on first side 310 of top strut(s) 319 and to maintain PV frame 208 of second PV module 204 on second side 312 of top strut(s) 319.

Retainer 702 may include one or more retaining tab 708 extending laterally from upright 706 to a lateral end 710. A length of retaining tab 708, i.e., a distance between upright 706 and lateral end 710, may be long enough that lateral end 710 terminates beyond inward edge 306 of PV frame 208. More particularly, inward edge 306 may be between upright 706 and lateral end 710 along the length of retaining tab 708. In an embodiment, retaining tab 708 extends from upright 706 above top strut 319 to form a receiving gap 712 that extends between retaining tab 708 and top strut 319. Accordingly, a portion of PV module 110 may be received within receiving gap 712, e.g., by sliding PV frame 208 over top strut 319 toward upright 706.

Figure 8:
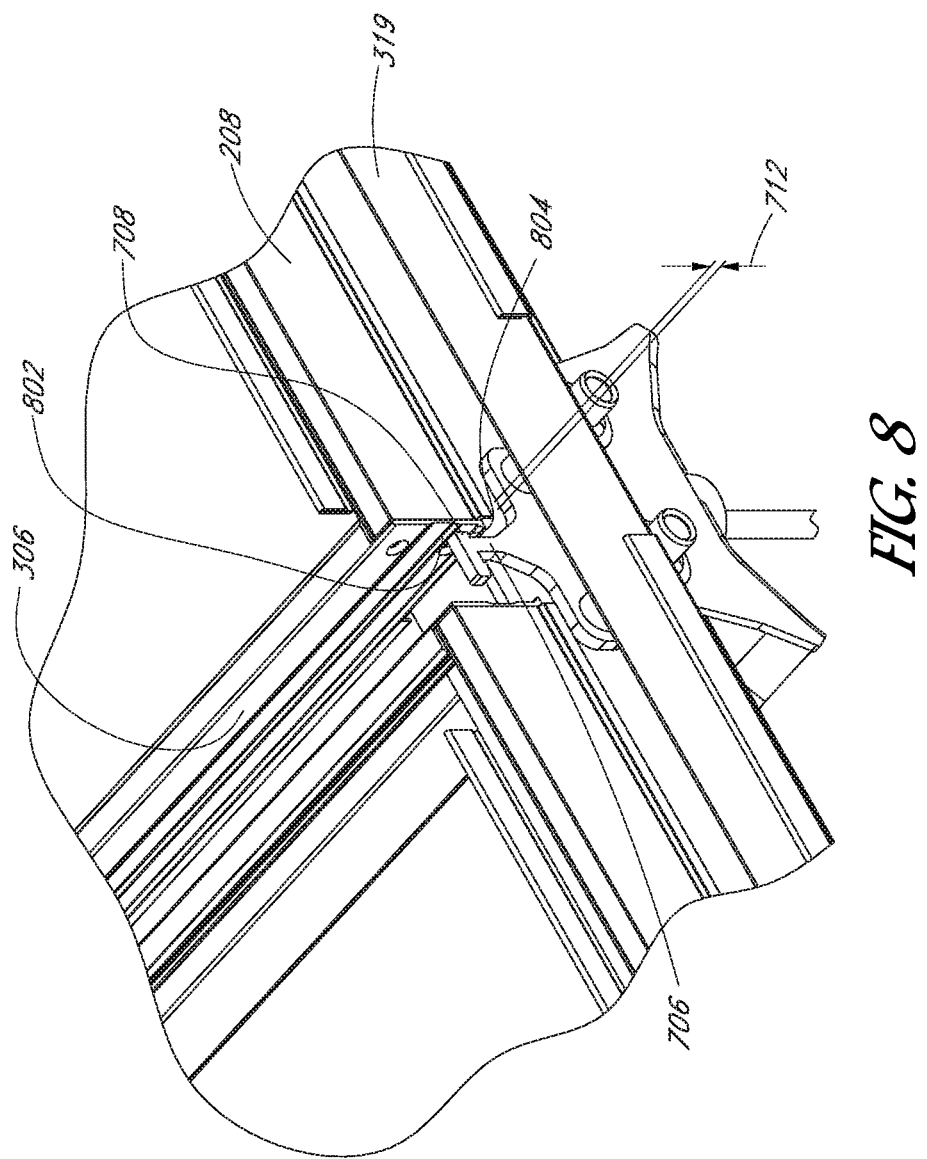
FIG. 8 illustrates a perspective view of a mounting assembly including a retainer constraining a PV module, in accordance with an embodiment of the present disclosure.

Referring to FIG. 8, a perspective view of a mounting assembly including a retainer constraining a PV module is shown in accordance with an embodiment of the present disclosure. Inward edge 306, which may be an inward facing surface of a structural member of PV frame 208, may include a slot 802. Slot 802 may be formed in inward edge 306 within a perimeter of the surface facing upright 706. Thus, when PV frame 208 is mounted on top strut 319, a retained portion 804 of inward edge 306 may be slid under retaining tab 708 into receiving gap 712, and retaining tab 708 may insert into slot 802 over retained portion 804, such that retaining tab 708 extends through slot 802 and engages slot 802 as a key in a hole. As such, retaining tab 708 may extend laterally over PV module 110 such that inward edge 306 of PV module 110 is within receiving gap 712.

When retainer 702 is positioned within slot 802 of inward edge 306, PV frame 208 may be constrained in several directions. For example, as described above, PV frame 208 of PV module 110 may be unable to slide further toward second PV module 204. Similarly, retaining tab 708 may constrain longitudinal and vertical movement of PV frame 208 because any movement in those directions may be limited by a size of slot 802.

Figure 9:
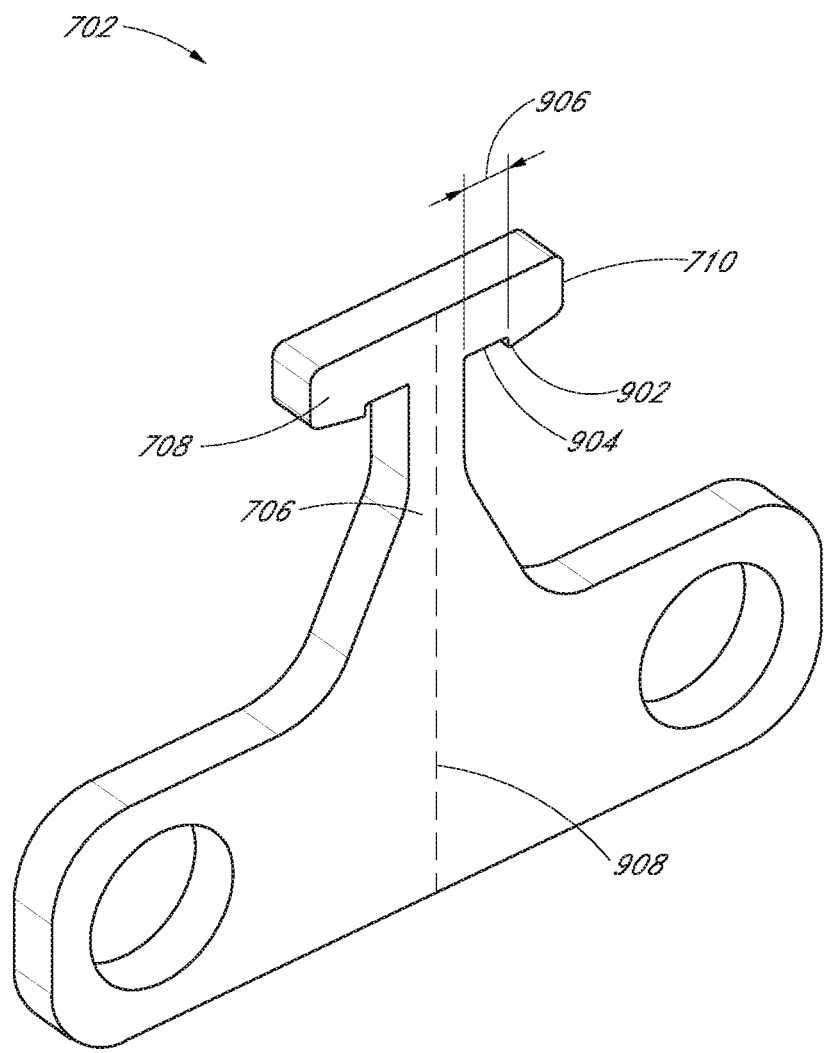
FIG. 9 illustrates a perspective view of a retainer, in accordance with an embodiment of the present disclosure.

Referring to FIG. 9, a perspective view of a retainer is shown in accordance with an embodiment of the present disclosure. Retainer 702 may include a hook portion 902 extending downward from lateral end 710 toward base 704 and/or top strut 319. Hook portion 902 may define a recessed wall 904 of retaining tab 708. That is, recessed wall 904 may be vertically higher than a point of hook portion 902, and may be nearer to upright 706 than the point. Accordingly, hook portion 902 may provide a retention feature to hook around the wall forming inward edge 306 of PV frame 208. For example, recessed wall 904 may have a recess width 906 greater than a thickness of the wall forming inward edge 306 of PV frame 208. As such, hook portion 902 may constrain lateral movement of PV frame 208 in the lateral direction away from upright 706.

Referring again to FIG. 3, lateral movement of PV module 110 relative to mounting assembly 202 may also be limited by a fastener 350. Fastener 350 may join PV frame 208 to top strut 319 at a fastener joint. Furthermore, the fastener joint may be laterally offset from retainer 702. For example, retainer 702 may be mounted along vertical plane 302, and the fastener joint may be spaced apart from vertical plane 302 along lateral plane 304. In an embodiment, fastener 350 is laterally outward from first end 322 of bottom strut 320. Thus, retainer 702 may limit movement of PV frame 208 near vertical plane 302 where tool access may be more difficult to achieve, and fastener 350 may be positioned at a more accessible location to resist shear loading.

Referring again to FIG. 9, retainer 702 is shown having a T-shaped configuration. That is, retainer tab 708 is a crossbar coupled to upright 706 near a medial location. Such configuration is offered by way of example, however, and other retainer geometries having a vertical and a lateral component may be used. For example, the unitary structure of retainer 702 may be split into two or more structures. More particularly, one skilled in the art will understand that retainer 702 may be separated along line of symmetry 908 to form two retainers 702 out of what is shown as a left and a right side of a single retainer 702. Each of the separate retainers 702 may then have respective L-shaped retainer geometries (inverted L shapes having horizontal portions extending away from line of symmetry 908). That is, each retainer 702 could have retainer tab 708 extending from an end of upright 706 in a respective direction opposite to the other retainer.

In an embodiment, upright 706 of retainer 702 may have a greater height than PV module 110. More particularly, whereas retainer 702 is described above as having retainer tab 708 to fit into slot 802, receiving gap 712 may be as tall or taller than a vertical height of inward edge 306 of PV frame 208. Thus, retainer tab 708 may extend laterally from upright 706 over a top surface of PV frame 208 and/or PV laminate 206.

In addition to retaining PV module 110, retainer 702 may also serve an electrical grounding function. For example, retainer 702, PV frame 208, and one or more components of mounting assembly 202 may be formed from an electrically conductive metal, such as aluminum. Accordingly, retainer 702 may be fastened to, and press against, the conductive component of mounting assembly 202 at base 704, and may engage the conductive PV frame 208 at lateral end 710 of retainer tab 708. In an embodiment, retainer 702 may include grounding features, such as teeth, roughened surface regions, pierce points, etc., to break through anodization or oxidation of PV module 110. As such, an electrical grounding path may be provided from PV frame 208 through retainer 702 to mounting assembly 202.

Assembly of the components described above may be performed in various manners. A method of assembling the components is described here, however, by way of example. At an installation site, pin 502 may be inserted through top support member hole 512 of top support member 314, and an upper mounting hole 410 of torque member 102. Pin 502 may extend fully through the inner lumen of torque member 102 to pass through a lower mounting hole 410 of torque member 102. An upper end collar 518 preloaded on pin 502 may rest on top mounting wall 504 and extend through member wall 402. Bottom support member 316 may be placed over pin 502 and against a lower outer surface 408 of member wall 402 such that pin 502 extends through bottom support member hole 514 of bottom support member 316. A lower collar end 518 may be placed over pin 502 and inserted through bottom support member hole 514 and the lower mounting hole 410 of member wall 402. Nut 516 may be threaded onto pin 502 and tighten down such that collar flange 524 clamps the support members 314, 316 against member wall 402. Top strut(s) 319 and bottom struts 320 may be fastened to respective bracket walls 602, and respective first ends 322 of bottom struts 320 may be fastened to top strut 319 to complete mounting assembly 202 mounted on torque tube. PV module 110 may be mounted on the assembled mounting assembly 202. For example, PV frame 208 may be placed on top strut 319 and slid toward retainer 702 until retaining tab 708 and/or upright 706 engage inward end 306 of PV frame 208. PV frame 208 may be fastened to top strut 319 at a laterally offset location from vertical plane 302, e.g., by fastener 350, to complete the PV module assembly 200.

Mounting assemblies for a PV module, and systems including such mounting assemblies, have been described. Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A mounting assembly, comprising:
a top support member having a top mounting wall and a top support member hole extending through the top mounting wall;
a bottom support member including a bottom mounting wall having a concave upward surface facing the top mounting wall of the top support member, and a bottom support member hole extending through the bottom mounting wall, wherein the bottom support member hole is centered within the concave upward surface of the bottom mounting wall of the bottom support member;
a pin assembly including a pin extending along a pin axis through the top support member hole and the bottom support member hole; and
a PV module coupled to the top support member.

2. The mounting assembly of claim 1, wherein the top mounting wall includes a concave downward surface facing the bottom mounting wall.

3. The mounting assembly of claim 2 further comprising:
one or more top struts extending orthogonal to the pin axis and outward from the top mounting wall; and
a plurality of bottom struts, wherein each bottom strut is coupled to the top strut at a second end.

4. The mounting assembly of claim 1, wherein the pin assembly includes one or more end collars, each end collar disposed in the top support member hole or the bottom support member hole, and wherein the end collars include a collar diameter greater than a pin diameter of the pin.

5. The mounting assembly of claim 4, wherein the collar diameters are at least twice the pin diameter.

6. The mounting assembly of claim 5, wherein each end collar includes a collar flange having a flange diameter greater than the collar diameter, and wherein each end collar extends through the top mounting wall or the bottom mounting wall from the collar flange outside of the support members to a collar end between the support members.

7. The mounting assembly of claim 6, wherein each collar includes a collar height between the collar flange and the collar end, and wherein the collar height is at least twice a thickness of the top mounting wall or the bottom mounting wall.

8. A photovoltaic (PV) module assembly, comprising:
a mounting assembly including
a top support member having a top mounting wall and a top support member hole extending through the top mounting wall,
a bottom support member including a bottom mounting wall having a concave upward surface facing the top mounting wall of the top support member, and a bottom support member hole extending through the bottom mounting wall, wherein the bottom support member hole is centered within the concave upward surface of the bottom mounting wall of the bottom support member, and
a pin assembly including a pin extending along a pin axis through the top support member hole and the bottom support member hole; and
a PV module having a PV laminate mounted on a PV frame, wherein the PV frame is mounted on the top support member.

9. The PV module assembly of claim 8, wherein the top mounting wall includes a concave downward surface facing the bottom mounting wall.

10. The PV module assembly of claim 9, wherein the top support member includes one or more top struts extending orthogonal to the pin axis and outward from the top mounting wall, wherein the PV frame is mounted on the one or more top struts, and wherein the bottom support member includes a plurality of bottom struts, and wherein each bottom strut is coupled to the one or more top struts at a first end.

11. The PV module assembly of claim 8, wherein the pin assembly includes one or more end collars, wherein each end collar is disposed in the top support member hole or the bottom support member hole, and wherein the end collars include a collar diameter greater than a pin diameter of the pin.

12. The PV module assembly of claim 11, wherein the collar diameters are at least twice the pin diameter.

13. The PV module assembly of claim 12, wherein each end collar includes a collar flange having a flange diameter greater than the collar diameter, and wherein each pin collar extends from the collar flange outside of the support members to a collar end between the support members through the top mounting wall or the bottom mounting wall.

14. The PV module assembly of claim 13, wherein each collar includes a collar height between the collar flange and the collar end, and wherein the collar height is at least twice a thickness of the top mounting wall or the bottom mounting wall.

15. A solar-tracking photovoltaic (PV) system, comprising:
a torque member extending along a longitudinal axis and pivotable about the longitudinal axis, wherein the torque member includes a member wall having a pair of diametrically opposed mounting holes;
a mounting assembly mounted on the torque member and including
a top support member including a top mounting wall having a top support member hole aligned with the pair of mounting holes,
a bottom support member including a bottom mounting wall having a concave upward surface facing the top mounting wall of the top support member, and a bottom support member hole aligned with the pair of mounting holes, wherein the bottom support member hole is centered within the concave upward surface of the bottom mounting wall of the bottom support member, and
a pin assembly including a pin extending along a pin axis through the top support member hole, the pair of mounting holes, and the bottom support member hole; and
a PV module having a PV laminate mounted on a PV frame, wherein the PV frame is mounted on the mounting assembly.

16. The solar-tracking PV system of claim 15, wherein the top mounting wall includes a concave downward surface, and wherein the concave surfaces conform to the member wall.

17. The solar-tracking PV system of claim 16, wherein the top support member includes one or more top struts extending orthogonal to the pin axis and outward from the top mounting wall, wherein the PV frame is mounted on the one or more top struts, and wherein the bottom support member includes a plurality of bottom struts coupled to the top strut at a first end.

18. The solar-tracking PV system of claim 15, wherein the pin assembly includes one or more end collars, wherein each end collar is disposed in the top support member hole or the bottom support member hole, and wherein the end collars include a collar diameter greater than a pin diameter of the pin.

19. The solar-tracking PV system of claim 18, wherein the collar diameters are at least twice the pin diameter.

20. The solar-tracking PV system of claim 19, wherein each end collar includes a collar flange having a flange diameter greater than the collar diameter, and wherein each end collar extends from the collar flange outside of the support members to a collar end within an inner diameter of the member wall.

* * * * *